Sept. 28, 1943.   A. E. BERRIMAN   2,330,465
WELDING APPARATUS
Filed April 1, 1939   2 Sheets-Sheet 1

Inventor
*Algernon Edward Berriman*

By *John P. Tarbox*
Attorney

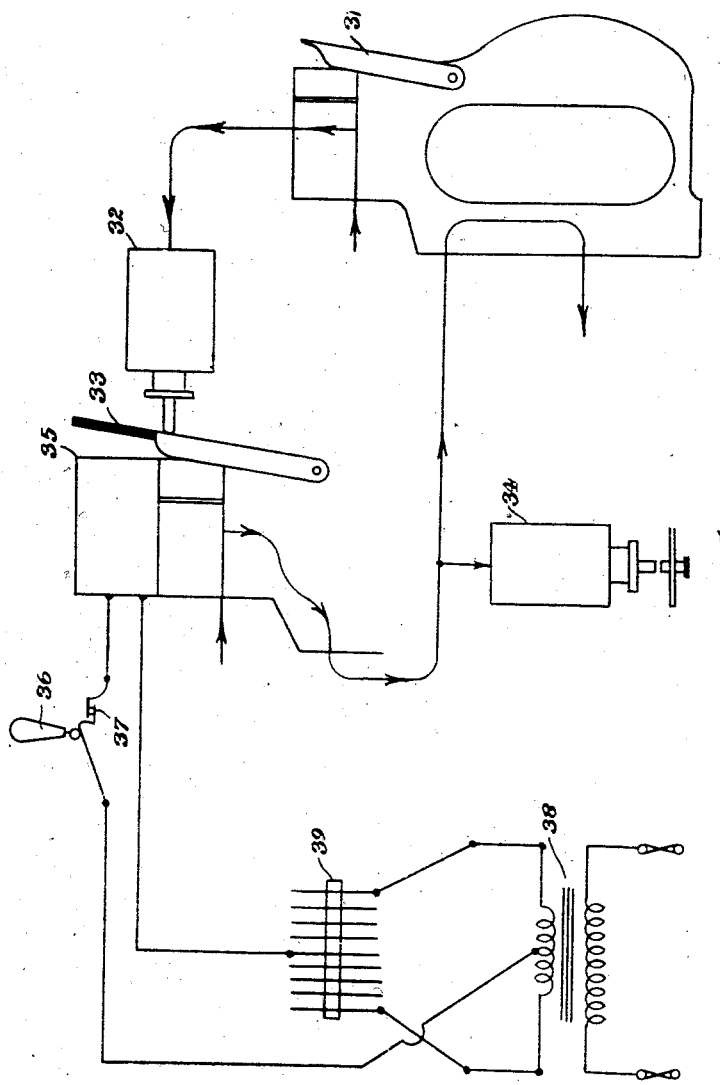

Patented Sept. 28, 1943

2,330,465

UNITED STATES PATENT OFFICE 2,330,465

WELDING APPARATUS

Algernon Edward Berriman, Oxford, England, assignor to Pressed Steel Company Limited, Oxford, England, a British company Application April 1, 1939, Serial No. 265,562
In Great Britain April 1, 1938

8 Claims. (Cl. 219—4)

This invention relates to welding apparatus of the kind in which the electrodes (commonly called, and hereinafter referred to as, dies) are moved towards and away from one another and held against the work to be welded, by an arrangement utilising fluid pressure.

The invention, though suitable for use with many kinds of welding apparatus, is particularly well adapted for use in connection with portable welding machines, commonly called welding guns, in which the pressure fluid is admitted into a cylinder in the body of the gun to move a piston in said cylinder and thereby bring the welding dies into contact with the work as a preliminary to the actual welding operation.

Admission of the pressure fluid, usually compressed air, to the cylinder is effected directly or indirectly by the operation of a suitable manual control such as a button or trigger provided on the gun.

In known machines of this kind the starting of the welding current is usually effected by means of an electrical or other relay operating automatically after the dies have been brought into contact with the work, and in some cases this relay is actuated by pressure fluid transmitted through a suitable by-pass to a suitable fluid operated relay controlling device. Such relay controlling devices usually embody means which is adjustable to suit varying conditions and in particular for the purpose of ensuring that the flow of welding current does not commence before the dies are properly in contact with the work.

Different welding operations require different periods of time during which the actual welding current shall flow, and it is now common to provide automatic time controlled devices which can be set to break the welding current circuit after the correct welding period has elapsed and independently of the will of the operator.

However, even when such automatic time controlled devices are employed, unsatisfactory welds may result if the period during which the dies remain in contact with the work is not controlled with care. Premature separation of the dies naturally results in an incomplete and unsatisfactory weld and both the work and the dies may be damaged.

The object of the present invention is to provide an arrangement whereby the period during which the dies remain in contact with the work is not left to the discretion of the operator but is determined automatically in conjunction with the time control of the period of flow of the welding current.

In accordance with the invention, a welding apparatus of the kind wherein the dies are moved relatively to one another and held in contact with the work through the medium of pressure fluid operated means, is provided with an automatic time controlled welding current circuit breaker, and an electro-magnetic locking device for maintaining a fluid pressure control valve as set, directly or indirectly, by the operator at the commencement of a welding operation, for a period in excess of that during which welding current flows.

In the preferred arrangement a manual control is provided in the form of a trigger mounted on the body of the gun and an electro-magnet is provided to hold the trigger in the position to which it is depressed to initiate the flow of pressure fluid to bring the dies into contact with, and to hold them against, the work. The electro-magnet is arranged to be permanently energised, the energising circuit thereof being however momentarily interrupted when the welding current circuit breaker is moved to its position to break the welding current circuit. This arrangement enables a very small magnet energised at very low voltage to be employed since it is not required to influence the trigger until the latter is moved down on to the magnet poles, and this offers the advantage of complete safety. A similar electro-magnet used in a circuit not permanently energised but energised only when the trigger is depressed would be ineffective due to induction lag.

The interruption of the magnet excitation circuit may be very conveniently effected by the welding current circuit breaker as the latter moves into the position for breaking the welding current circuit.

Direct current for exciting the magnet may be obtained from the alternating current mains by the use of a small transformer and rectifier.

In an alternative arrangement the manual control may operate through a fluid pressure or otherwise controlled relay to move a valve located remote from the manual control, to initiate the flow of pressure fluid and move the dies towards one another and hold them against the work, and the electro-magnetic holding device may be utilised to hold said valve in the appropriate position irrespective of the position of the manual control and for a period in excess of that during which the welding current flows.

This arrangement offers the advantage that no electrically operated devices need to be mounted on the handle of the gun.

The invention is illustrated in the accompanying drawings in which

Fig. 2 is a diagrammatic representation of an alternative arrangement.

Figure 1:
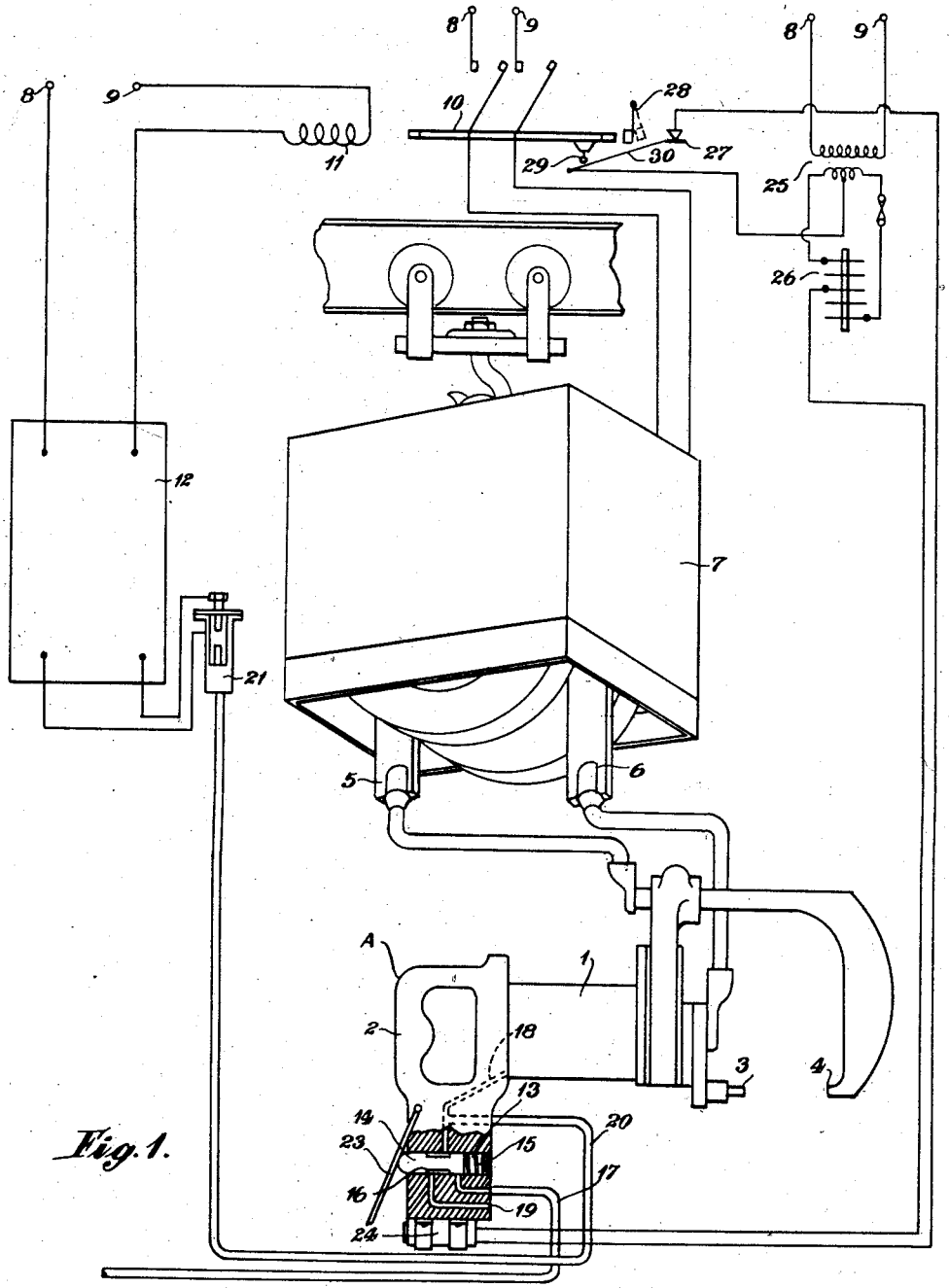
Fig. 1 shows a general arrangement partly in perspective of a portable gun in which the electro-magnetic locking device is arranged on the handle.

In Fig. 1 the welding gun is indicated by the general reference A and it includes the usual cylinder 1, a handle 2 and dies 3 and 4, die 3 being arranged for movement towards and away from die 4 under the influence of a piston (not shown) which is moved in the cylinder 1 when pressure fluid is introduced.

The dies 3 and 4 are connected through leads leads 5 and 6 with the output side of a transformer 7 the primary of which is adapted to be connected with the mains 8 and 9 through a circuit breaker 10 which in the case illustrated is represented as sliding to and fro to make and break the welding current circuit.

The movements of the circuit breaker 10 are effected by an operating coil 11 under the control of an adjustable timing control switch 12 so that the period during which the welding circuit remains closed is automatically determined.

The control for the pressure fluid is as follows. In the handle 2 of the gun is formed a passage 13 in which a plunger 14 is arranged for sliding movements. The passage 13 is closed at one end and a light spring 15 is provided tending to thrust the plunger outwards.

The plunger is provided with an annular recess 16 of given length. A passage 17 leads compressed air or the like from a convenient source to the interior of passage 13. A passage 18 leads compressed air to the interior of cylinder 1 and a passage 19 leads compressed air to exhaust.

A passage 20 serves as a by-pass leading compressed air from passage 18 to a compressed air operated relay 21 for operating the timing control switch 12. A pivoted trigger 23 is mounted on the handle of the gun and this trigger when depressed towards the handle of the gun by the operator, moves plunger 14 to a position where the air inlet 17 is in communication with passage 18 and is cut off from exhaust passage 19. As a consequence compressed air is introduced into the interior of cylinder 1 to move the dies into engagement with the work. At the same time air is led by by-pass 20 to the fluid pressure operated relay 21 to throw in the timing control switch 12 and thereby excite coil 11 to move contact breaker 10 into the position for closing the welding current circuit. The relay 21 is preferably arranged to throw in the timing control switch only after the dies 3 and 4 are in contact with the work.

In accordance with the invention means are provided for locking the trigger 23 and the valve 14 in this position until the welding operation is completed.

For this purpose an electro-magnet 24 is mounted on the handle of the gun in a position where trigger 23 engages the poles thereof when in the depressed position, and this magnet retains the trigger depressed.

The magnet 24 is permanently excited by direct current from the mains through a transformer 25 and rectifier 26. A very low voltage may be employed and in practice a current of ½ ampere at 6 volts has been found to suffice.

The magnet is such as not to influence the trigger 23 when the latter is in the position when away from the handle as shown in Fig. 1 but to hold said trigger 23 in the depressed position after depression thereof by the operator.

Release of the trigger 23 is effected by a momentary interruption of the circuit of electro-magnet 24 by opening a switch 27 therein.

This may be conveniently effected by the movement of the bar 10 of the welding current circuit breaker as the latter moves into its position to break the welding current circuit on completion of the period for which time control 12 has been set.

In the case illustrated the bar 10 as it moves to the circuit breaking position as shown strikes against a yielding and restoring buffer 28 and whilst in its extreme position a projection 29 on the bar 10 engages a rocker arm 30 to open the switch 27 to break the circuit of the electro-magnet 24.

Buffer 28 however causes a slight movement of bar 10 in the return direction by virtue of its restoring force, so that projection 29 is disengaged from rocker arm 30 and the switch 27 is again closed. The resulting momentary de-energisation of magnet 24 releases trigger 23, and valve 14 is permitted to move under the thrust of spring 15 so that the compressed air supply passage 17 is cut off from the passages 18 and 20 leading to the cylinder 1 and relay 21 and the passages 18 and 20 are placed in communication with exhaust passage 19. The dies 3 and 4 are thus permitted to move apart and disengage from the work.

Thus both the period of flow of the welding current and the period during which the dies are in engagement with the work are under the control of the automatic timing device 12 and it is ensured that the dies engage the work before the welding current begins to flow and remain in engagement therewith until the flow of welding current ceases.

Fig. 2 shows the invention applied to an arrangement which obviates the necessity for mounting any electrically operated parts on the handle of the gun.

In this case a trigger 31 on the handle of the gun (or a pedal on a suitable separate structure where it is desired that both hands of the operator shall be free) operates to move a valve permitting compressed air to flow to a compressed air relay 32 which serves in turn to rock a lever 33 to move a further valve whereby compressed air is led to the cylinder of the gun and to a compressed air controlled relay 34 which serves to throw in the time control switch moving the welding current circuit breaker. The permanently excited electro-magnet 35 is provided in a position to hold lever 33 depressed to maintain the air pressure in the cylinder of the gun and in relay 34 after the operator's trigger 31 is released and the plunger of relay 32 moved away from lever 33. In this case also the dies are moved into contact with the work before the welding circuit is closed and are maintained in contact with the work after the trigger 31 is released by the operator.

Release of the lever 33 and the compressed air valve controlled thereby takes place when the circuit of the electro-magnet 35 is momentarily broken. This again is effected by the movement of the welding current circuit breaker to the open position, a member 36 moving therewith to momentarily open a switch 37 in the circuit of the electro-magnet.

Current for the electro-magnet 35 is derived from the mains as before, through a transformer 38 and rectifier 39.

The magnet 35, lever 33 and the compressed air valve controlled by said lever 33 may in this arrangement be conveniently located on the cylinder of the welding apparatus with the advantage that the long exhaust passages may be avoided and parting of the dies effected with rapidity.

I claim:

1. A welding apparatus of the kind wherein the welding dies are moved relatively to one another and held in contact with the work through the medium of a pressure fluid, comprising a movable contact breaker for the welding current circuit, a timing device adapted to determine the time interval between the make and break movements of said contact breaker, a manual control for starting and stopping the flow of the pressure fluid to cause the dies to move relative to each other and an electro-magnetic looking device for maintaining the manual fluid pressure control as set by the operator at the commencement of a welding operation, for a period in excess of that during which welding current flows and means for unlocking said device dependent upon operation of said breaker.

2. A welding apparatus of the kind wherein the welding dies are moved relatively to one another and held in contact with the work through the medium of a pressure fluid, comprising a control for initiating the flow of pressure fluid, means responsive to the pressure fluid to cause the welding dies to move relative to each other, a movable contact breaker for the welding current circuit, a timing device controlling the period between the circuit closing and opening movements of said contact breaker, fluid pressure operated means controlling said timing device and a locking device for maintaining the manual fluid pressure control as set by the operator at the commencement of a welding operation, for a period in excess of that during which welding current flows and means for unlocking said device dependent upon the operation of said breaker.

3. A welding apparatus of the kind wherein the welding dies are moved relatively to one another and held in contact with the work through the medium of a pressure fluid, comprising a manual control for initiating the flow of pressure fluid, means responsive to the pressure fluid to cause the welding dies to move relative to each other, a movable circuit breaker for the welding current circuit, a timing device controlling the period between the closing and opening movements of said circuit breaker, a normally permanently energized electro-magnetic locking device for maintaining the manual fluid pressure control as set by the operator at the commencement of a welding operation, for a period in excess of that during which welding current flows and means for unlocking said device dependent upon the operation of said breaker.

4. A welding apparatus of the kind wherein the welding dies are moved relatively to one another and held in contact with the work through the medium of a pressure fluid, comprising a manual control for initiating the flow of pressure fluid, means responsive to the pressure fluid to cause the welding dies to move relative to each other, a movable contact breaker for the welding current circuit, a timing device controlling the period between the closing and opening movements of said circuit breaker, a permanently energised electro-magnetic locking device for maintaining the manual fluid pressure control as set by the operator at the commencement of a welding operation, for a period in excess of that during which welding current flows and means coupled with the welding current circuit breaker and adapted to momentarily interrupt the circuit of said electro-magnetic locking device as the welding current circuit is broken.

5. A welding apparatus of the kind wherein the welding dies are moved relatively to one another and held in contact with the work through the medium of a pressure fluid, comprising a valve for controlling the flow of pressure fluid, a manually controlled member adapted to be operated to move said valve, means responsive to fluid pressure when said valve is operated, adapted to cause the welding dies to move relative to each other, an electro-magnetic locking device for maintaining said valve in the position to which it is moved at the commencement of a welding operation, for a period in excess of that during which welding current flows and means for unlocking said device dependent upon the operation of said breaker.

6. A welding apparatus of the kind wherein the welding dies are moved relatively to one another and held in contact with the work through the medium of a pressure fluid, comprising a manual control for initiating the flow of pressure fluid, means responsive to the pressure fluid to cause the welding dies to move relative to each other, a movable contact breaker for the welding circuit adapted to move between a circuit closing position through a neutral position to an extreme open circuit position, a buffer device adapted to be engaged by the movable contact breaker in said extreme open circuit position and to return said contact breaker to a neutral position, a timing device controlling the period between the circuit closing and opening movements of said contact breaker, a permanently energised electro-magnetic locking device for maintaining the manual fluid pressure control as set by the operator at the commencement of a welding operation, for a period in excess of that during which welding current flows, and means coupled with the welding current circuit breaker and adapted to momentarily interrupt the circuit of said electro-magnet as said contact breaker moves in the direction to engage the buffer device but to leave the circuit to said electro-magnet uninterrupted as said contact breaker is returned to its neutral position.

7. A welding apparatus of the kind wherein the welding dies are moved relatively to one another and held in contact with the work through the medium of a pressure fluid, and including a cylinder, a piston movable in said cylinder and connected with one die, a valve adapted to be operated to permit pressure fluid to enter said cylinder and move the piston to move said die, a movable contact breaker in the welding current circuit, a time control device for determining the period during which welding current flows and an electro-magnetic locking device for holding the valve in the position in which it is set at the commencement of a welding operation and for holding said valve in that position until after the welding current circuit is broken by the contact breaker and means for unlocking said device dependent upon the operation of said breaker.

8. A welding apparatus of the kind wherein the welding dies are moved relatively to one another and held in contact with the work through the medium of a pressure fluid, comprising a manual control for initiating the flow of pressure fluid, means responsive to the pressure fluid to cause the welding dies to move relative to each other, a circuit breaker for the welding current circuit, a timing device controlling the period between the closing and opening movements of said circuit breaker, a locking device for maintaining the manual fluid pressure control as set by the operator at the commencement of a welding operation, for a period in excess of that during which welding current flows, and means responsive to the opening movement of said circuit breaker for unlocking said device.

ALGERNON EDWARD BERRIMAN.